Aug. 21, 1962 E. J. HLINSKY ETAL 3,050,293
ROTARY MINING HEAD AND CORE BREAKER THEREFOR
Filed May 12, 1960
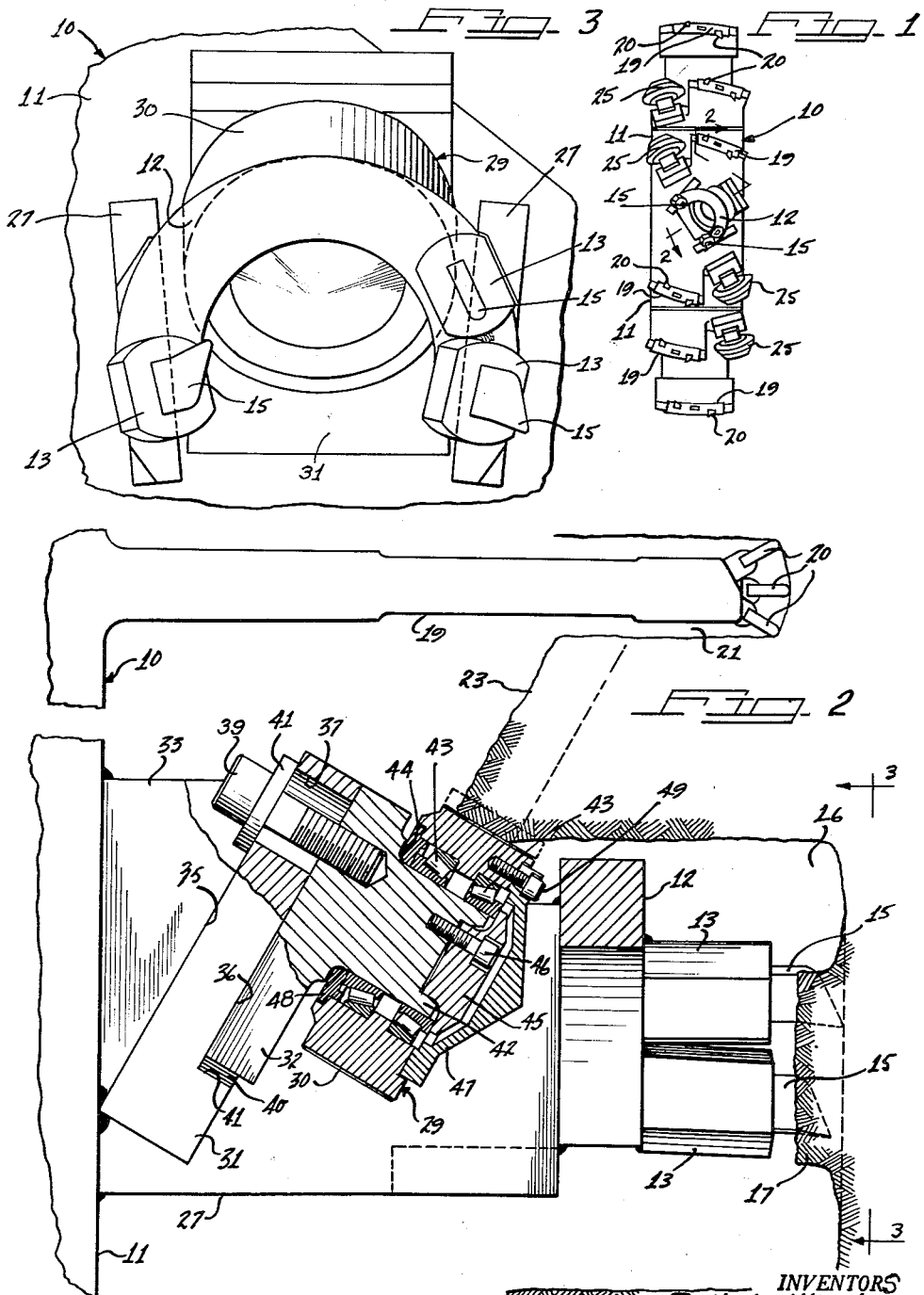
INVENTORS
Emil J. Hlinsky
Richard C. Lundquist
BY
ATTYS.

United States Patent Office 3,050,293
Patented Aug. 21, 1962

3,050,293
ROTARY MINING HEAD AND CORE BREAKER THEREFOR
Emil J. Hlinsky, La Grange Park, and Richard C. Lundquist, Palos Heights, Ill., assignors to Goodman Manufacturing Company, Chicago, Ill., a corporation of Illinois
Filed May 12, 1960, Ser. No. 28,593
3 Claims. (Cl. 262—9)

This invention relates to improvements in rotary boring heads for continuous mining machines, for boring out a complete working face in coal, rock, and the like, and more particularly relates to an improved core breaker arrangement for breaking the cores between the annular kerfs cut by the rotary cutters of the boring head.

Heretofore, rotary boring head types of continuous mining machines have been provided with breaker wedges and freely rotatable core breaker disks for breaking down the cores between the annular cutters of the boring head. While such wedges and disks will effectively break the cores in many materials, due to space limitations they have not been effective in breaking the core between the pilot cutter and the annular cutters spaced radially outwardly therefrom.

A principal object of the invention is to remedy the foregoing difficulties by providing an improved form of rotatable core breaker device for more efficiently breaking the core spaced radially outwardly of the pilot cutter.

A further object of the invention is to improve upon previous core breaker devices for rotary boring heads and the like, by utilizing an eccentrically rotatable core breaker roller having a relatively wide core breaker face engaging the core with a wedging core breaking action, in which the core breaker roller is to the rear of and partially enclosed by the pilot cutter.

A still further object of the invention is to improve upon the core breaker devices heretofore in use to break the core radially outwardly of the pilot cutter by utilizing an eccentrically mounted roller rotatable about an eccentric axis inclined to pitch the face of the roller at a wedging angle with respect to the core and by mounting the core breaker roller within the rearwardly extended limits of the pilot cutter with the inclined core breaker face thereof generally forming a continuation of the pilot cutter.

These and other objects of the invention will appear from time to time as the following specification proceeds and with reference to the accompanying drawing wherein:

FIGURE 1 is a front end view of a rotary boring head constructed in accordance with the principles of the present invention;

FIGURE 2 is an enlarged partial fragmentary view in side elevation of the boring head shown in FIGURE 1, with parts of the pilot cutter broken away and shown in vertical section, and showing the core breaker roller and its support in partial vertical section; and FIGURE 3 is a fragmentary front end view of the boring head looking substantially along line 3—3 of FIGURE 2.

In the embodiment of the invention illustrated in the drawing, 10 generally designates a rotary boring head for a continuous mining machine having a plurality of diametrically opposed radially extending boring arms 11. Any number and spacing of boring arms may be provided, the number and spacing being dependent upon the material being mined.

As herein shown, two arms 11 are provided and extend diametrically in opposite directions from a central hub (not shown) rotatably driven by suitable reduction gearing carried in a gear casing for the mining machine (not shown).

The boring head 10, has a central pilot cutter 12 in the general form of a segment of a circle and having blocks 13, 13 projecting forwardly therefrom for detachably carrying cutter bits 15, for cutting a central annular kerf 16 in the working face of a mine leaving a plug 17 at the center of the bore, which is broken down as the boring head progresses into the working face.

Each boring arm 11 is also provided with a series of radially spaced forwardly projecting cutter supports 19, 19 having cutter bits 20, 20 detachably mounted therein and projecting from the forward faces of said cutter supports. The cutter bits 20 are inclined at various angles with respect to each other and with respect to the associated cutter supports in a conventional manner, to cut clearance for the associated cutter supports as they cut a series of concentric annular kerfs in the working face of the material being mined.

In FIGURE 2 of the drawings, the cutting support 19 spaced radially outwardly of and adjacent the pilot cutter support 13 is shown as cutting an annular kerf 21 concentric with the annular kerf 16, the inner wall of said annular kerf, with the outer wall of the annular kerf 16 defining an annular core 23.

Mounted in trailing relation with respect to the two inner cutter supports 19 are rotary core breaker disks 25 entering the kerfs cut by the associated cutter supports and having direct engagement with the outer wall of the kerf, in a manner similar to the core breaker disks shown and described in our application Serial No. 21,548, filed April 11, 1960, and entitled "Rotary Boring Head and Core Breaker Therefor," now Patent No. 3,010,708, so not herein shown or described further.

The pilot cutter support 12 is shown as extending partially along and as being mounted on the forward end portions of two laterally spaced plates 27. The plates 27 extend along the boring arm 11 and diverge outwardly with respect to each other as they extend outwardly along said boring arm and may be welded or otherwise secured to said boring arm.

The cutter support 12 may be welded or otherwise secured to the forward end portions of said plate to be supported in advance of the boring arm 11 to position its cutters to make an initial pilot cut or kerf in the working face, as the machine is advanced thereinto.

A core breaker roller 29 is shown in FIGURE 2 as being mounted between the plates 27 and as having a peripheral face 30 inclined with respect to the axis of rotation of the boring head to engage the core 23 along the outer wall of the kerf 16 with a wedging core breaking action.

As shown in FIGURE 2, an abutment plate 31 forms an adjustable support for a bearing support member 32 for the core breaker roller 29. The abutment plate 31 is shown as being inclined forwardly with respect to the boring arm 11 from its inner to its outer end and as being mounted on the boring arm 11 on spacer blocks 33 welded or otherwise secured to said boring arm and having inclined faces 35 extending at the angle of inclination of the abutment plate 31. The abutment plate 31 may be secured to the spacer blocks 35 as by welding, or in any other suitable manner.

The abutment plate 31 has a recessed front face 36 abutted by the bearing support 32. Elongated holes 37 extend through the support plate 35 adjacent opposite sides thereof for receiving machine screws 39 extending through said holes and threaded within the bearing support 32. The heads of the machine screws 39 abut washers 41 extending about the elongated holes 37. The holes 37 are elongated to accommodate adjustment of the bearing support 32 along the abutment plate 31 to adjust core breaker face 30 of the core breaker roller 29 in the proper relation with respect to the kerf wall and core. As shown in FIGURE 2, shims 40 are interposed between the inner side of the bearing support 32 and a shoulder portion 41 of the abutment plate 31, to retain the bearing support 32 in the desired position of adjustment prior to and upon tightening of the machine or cap screws 39.

The bearing support 32 has a boss 42 projecting forwardly therefrom perpendicular to the plane of the abutment plate 31 and having spaced oppositely facing thrust bearings 43 mounted thereon, forming bearings for the core breaker roller 29. An annular dust retainer 48 abuts the inner end of the inner thrust bearing 43 and is recessed within one face of the core breaker roller 29 and abuts at its opposite side a shouldered portion 44 of the boss 42, to seal the thrust bearings 43 from dust.

A bearing cap 45 is partially recessed within the outer end portion of the boss 42 and extends over the inner face of the outer thrust bearing 43, to form a retainer therefor. The cap 45 is secured to the boss 42, as by machine screws 46. The outer end of the core breaker roller 30 is closed by an end cap 47 extending over the bearing cap 46 and partially recessed within and secured to the outer rim of the core breaker roller 30 as by machine screws 49.

The axes of rotation of the thrust bearings 43 are eccentric of the concentric rotational axis of the core breaker roller 30. The thrust bearings 43 thus mount the core breaker roller 30 on the bearing support 42 for rotation about an axis eccentric of the center of said core breaker roller, to effect movement of said core breaker roller from the solid line position shown in FIGURE 2 to the broken line position shown in this figure, during operation of the boring head.

During operation of the boring head, the angle of inclination of the wedging face 30 of the core breaker roller 29 is such as to bring the face of the core breaker roller into wedging engagement with the core 23 initially along the edge of the outer wall of the kerf 16. Engagement of the core breaker roller with the core will effect rotational movement of said roller as the boring head is rotated, and cause said core breaker roller to periodically move into the core with a wedging action as said core breaker roller is advanced into the core in an axial direction. The core breaker roller 30 thus in effect forms a rearward continuation of the segmental cutter support 12 following the cutter bits 15 into the kerf cut thereby and exerting a continuous core breaking effect during the boring operation.

It may be seen from the foregoing that the axis of rotation of the core breaker roller 29 positions the face 30 thereof to form a core breaker wedge, and that the eccentric mounting thereof increases the breaking action of the core breaker roller periodically during rotation thereof and moves the core breaker face to exert a continuous periodical core breaking effect, and besides periodically increasing the wedging action also in effect concentrates the breaking force at the outer end portion of the core, and attains the same breaking effect that would be attained by a concentrically mounted roller having a far wider breaking face than the breaking face of the roller shown, and exerts this breaking effect upon a reduced axial travel of the boring head from that which could be attained by a wider core breaker roller or a fixed wedge rotating with the boring head.

The eccentrically mounted roller, therefore, makes it possible to efficiently break the core with a shorter wedging face than formerly and also makes it possible to support the core breaker roller in the confined space behind the pilot cutter, resulting in a more compactly arranged and efficient core breaker roller than has heretofore been possible to attain.

While we have herein shown and described one form in which our invention may be embodied, it may readily be understood that various variations and modifications in the invention may be attained without departing from the spirit and scope of the novel concepts thereof as defined by the claims appended hereto.

We claim as our invention:

1. In a rotary core breaker for continuous mining machines of the boring type having at least one rotatable boring arm having a central pilot cutter and spaced annular cutters spaced radially outwardly therefrom, and means for breaking the core left between said pilot cutter and the next adjacent annular cutter comprising a rotatable core breaker roller having a peripheral core breaker face parallel to the axis of rotation of said core breaker roller, means for mounting said pilot cutter on said boring arm in advance of said boring arm comprising two laterally spaced plates extending in advance of said boring arm, and means for mounting said core breaker roller in the space between said plates and rearwardly of said pilot cutter with the major portion thereof within the confines of the rearwardly extended limits of said pilot cutter comprising an abutment plate inclined outwardly with respect to said boring arm, a bearing support plate mounted on said abutment plate and having a boss extending forwardly therefrom perpendicular to the forward face of said support plate, and bearing means mounting said core breaker roller on said boss for rotation about an axis eccentric of the concentric center of said core breaker roller to effect an in and out wedging core breaking action of the peripheral core breaker face of said roller upon rotational movement of said boring head, and frictional engagement of said core breaker face with the core.

2. In a rotary boring head, a boring arm having a pilot cutter spaced in advance thereof and coaxial with the axis of rotation thereof for cutting an annular kerf in a mine face and having at least one annular cutter spaced radially outwardly of said pilot cutter, an abutment plate mounted on said boring arm and inclined outwardly with respect to said boring arm at an acute angle with respect to the axis of rotation thereof, a bearing support plate mounted on said abutment plate and having a boss extending forwardly therefrom perpendicular to the forward face of said bearing support plate, a freely rotatable core breaker roller having a cylindrical core breaker face, and bearing means mounting said core breaker roller on said boss for rotation about an axis eccentric of the concentric center of said core breaker roller and parallel to the axis of said boss and inclining said cylindrical face of said core breaker roller at a wedging angle with respect to said pilot cutter and effecting in and out wedging core breaking action of said cylindrical core breaker face of said roller by frictional engagement of said core breaker face with the core and rotational and axial feeding movement of said boring head into a mine face.

3. In a rotary core breaker for continuous mining machines of the boring type having a rotatable boring arm having a central pilot cutter and radially spaced annular cutters projecting forwardly from said boring arm for cutting a series of concentric annular kerfs in a mine face, an inclined core breaker roller for breaking the core between said pilot cutter and the next adjacent annular cutter, and downwardly inclined shaft means spaced radially inwardly of said annular cutters and rearwardly of said pilot cutter for mounting said core breaker roller on said boring arm for rotation about an axis extending generally axially of the axis of rotation of said boring arm and inclined radially inwardly from said boring arm toward the axis of rotation thereof and eccentric of the center of said core breaker roller, said core breaker roller having a cylindrical peripheral core breaking face spaced rearwardly of and diverging angularly outwardly of said pilot cutter at a wedging angle with respect to the core parallel to the axis of said shaft means, and periodically moving inwardly with respect to and outwardly of the core effected by axial advance of said boring head into the mine face and rotational movement thereof.

References Cited in the file of this patent
UNITED STATES PATENTS

| | | |
|---|---|---|
| 1,603,621 | McKinlay | Oct. 19, 1926 |
| 2,754,099 | Tracy | July 10, 1956 |
| 2,768,820 | Russell | Oct. 30, 1956 |
| 2,879,049 | Poundstone | Mar. 24, 1959 |